Patented Aug. 8, 1939

2,168,685

UNITED STATES PATENT OFFICE 2,168,685

COMPOUNDS OF THE CYCLOPENTANO-HYDROPHENANTHRENE SERIES AND PROCESS OF MAKING SAME

Leopold Ruzicka, Zurich, Switzerland, assignor to the firm of Society of Chemical Industry in Basle, Basel, Switzerland No Drawing. Application October 25, 1937, Serial No. 170,958. In Switzerland November 2, 1936

6 Claims. (Cl. 260—397)

Unsaturated 3-epi-hydroxy-compounds of the cyclopentano-hydrophenanthrene series, with the exception of epi-cholesterol, have not hitherto been described. Epi-cholesterol has been obtained by Marker and his co-workers (Journal of the American Chemical Society, vol. 58, pages 481 and 1948) by the reaction of cholesteryl chloride with magnesium and decomposition of the organo-magnesium compound thus produced with oxygen. There is formed a mixture of cholesterol and epi-cholesterol which can be resolved into its constituents either with the aid of digitonine or by fractional crystallization of the acetates and finally of the benzoates. Since epi-cholesterol acetate passes when brominated into tetra-bromocholestane with elimination of acetic acid (compare Marker and his co-workers) it could not be foreseen that by oxidational degradation of the side chain there would be produced the $\Delta^5$-3-epi-hydroxyandrostenone-(17), a hitherto unknown compound from the series of male sexual hormones.

The present invention is based on the observation that quite generally there are obtained $\Delta^5$-unsaturated 3-epi-hydroxy-compounds of the cyclopentano-hydrophenanthrene series when the ketonic group of a $\Delta^5$-unsaturated 3-keto-compound of this series is reduced while preserving the double linking in a neutral medium to a carbinol group and if desired the mixture of stereoisomeric alcohols obtained is subjected to a separating process.

The partial reduction may be performed catalytically with hydrogen in presence of a noble or non-noble metal or metal oxide for instance platinum, platinum oxide, nickel, cobalt or a mixture of metals with or without a carrier in a neutral solvent or even with aluminum amalgam. For separating the epi-compound produced from its isomeride digitonine or the like is preferably used or suitable derivatives of the compounds may be fractionally crystallized.

As is known, $\Delta^5$-unsaturated 3-keto-compounds of the cyclopentano-hydrophenanthrene series isomerise extraordinarily easily into $\Delta^4$-unsaturated ketones. It is very surprising that under the foregoing conditions neither this isomerisation occurs nor are compounds of the copro-series produced. It is also known that for making saturated epi-hydroxy-compounds of cyclopentano-hydrophenanthrene from corresponding ketones the reduction is performed in an acid medium whereas here $\Delta^5$-unsaturated hydroxy-compounds are produced already by reduction in neutral medium.

For instance from $\Delta^5$-cholestenone (compare Butenandt and Schmidt-Thomé, Ber. 69,882) there is obtained by the present invention epi-cholesterol mixed with more or less cholesterol; from this mixture pure epi-cholesterol may easily be procured after separating the cholesterol, for instance with digitonine. From $\Delta^5$-androstenedione (3,17) one obtains in like manner $\Delta^5$-3-epi-hydroxy-androstenone-(17) or epi-dehydro-androsterone. Starting for example, from esters of $\Delta^5$-testosterone there are produced the corresponding 17-mono-esters of $\Delta^5$-3-epi-hydroxy-17-hydroxy-androstene which may be saponified by the usual methods to $\Delta^5$-3-epi-hydroxy-17-hydroxy-androstene. The same diol may be obtained directly from $\Delta^5$-androstenedione when the reduction is continued until 2 mol hydrogen have been absorbed. If $\Delta^5$-17-alkyl-testo-sterones are reduced the corresponding $\Delta^5$-17-alkyl-3-epi-hydroxy-17-hydroxy-androstene derivative is obtained.

The following examples illustrate the invention, the parts being by weight:

Example 1

1 part of $\Delta^5$-cholestenone is dissolved in 10 parts of cyclohexane and after addition of 1 part of an active nickel catalyst is shaken at room temperature with hydrogen without the use of pressure. When 1 mol hydrogen has been absorbed the solution is filtered and evaporated. The reduction product is mixed in alcohol solution with digitonine. The alcohol is evaporated in a vacuum and the residue is extracted by means of ether. The portion soluble in ether is recrystallized from alcohol whereby epi-cholesterol is obtained melting at 141° C. corrected. The acetate obtained in the usual manner melts at 85° C.

Example 2

1 part of $\Delta^5$-androstenedione is dissolved in 10 parts of ethyl alcohol of 95 per cent. strength and after addition of 1 part of an active nickel catalyst is hydrogenated in the manner described in Example 1. When 1 mol hydrogen has been absorbed hydrogenation is stopped. The whole is filtered, an alcohol solution of digitonine is added and the alcohol is evaporated in a vacuum. The residue is extracted with ether. The portion soluble in ether is recrystallized from ether or ethyl acetate whereby there is obtained the $\Delta^5$-3-epi-hydroxy-androstenone-(17) which melts at 218° C. corrected. The acetate prepared in the usual manner melts at 173.5–174.5° C. corrected.

Example 3

1 part of Δ⁵-testosterone-propionate is dissolved in 60 parts of ethyl alcohol, of 95 per cent. strength and after addition of 1 part of an active nickel catalyst is shaken at room temperature with hydrogen. When 1 mol of hydrogen has been absorbed the solution is filtered and evaporated. The reduction product is mixed in alcoholic solution with digitonine, the alcohol is evaporated and the residue extracted by means of ether. The ethereal solution is filtered and evaporated. The residue is saponified with methyl alcoholic caustic soda solution to obtain the Δ⁵-3-epi-hydroxy-17-hydroxy-androstene of melting point 207–208° C. It forms a di-acetate of melting point 155–155.5° C.

Instead of Δ⁵-testosterone-propionate another ester may just as well be used as parent material, for example the acetate, a butyrate, higher esters, as well as ethers.

Instead of the nickel catalyst there may for example also be used a cobalt, a nickel-cobalt, a platinum or a palladium catalyst. The reduction of the keto-group can generally be carried out with agents which are capable of reducing a keto-group in a neutral medium without double linkings being saturated thereby. This reduction can thus also be carried out for example with aluminium amalgam.

In similar manner there are also produced for example Δ⁵-3-epi-hydroxy-17-hydroxy-androstene compounds which are still substituted in 17-position by alkyl radicals, for example methyl, ethyl or propyl radicals.

What I claim is:

1. A process for the manufacture of Δ⁵-unsaturated 3-epi-hydroxy-compounds of the cyclopentano-hydrophenanthrene series, comprising reducing the ketonic group of Δ⁵-unsaturated 3-keto-compounds of the cyclopentano-hydrophenanthrene series in a neutral medium to a carbinol group.

2. A process for the manufacture of Δ⁵-unsaturated 3-epi-hydroxy-compounds of the cyclopentano-hydrophenanthrene series, comprising reducing the ketonic group of Δ⁵-unsaturated 3-keto-compounds of the cyclopentano-hydrophenanthrene series in a neutral medium to a carbinol group with hydrogen in presence of a hydrogenating metal catalyst.

3. A process for the manufacture of Δ⁵-unsaturated 3-epi-hydroxy-compounds of the cyclopentano-hydrophenanthrene series, comprising reducing the ketonic group of Δ⁵-unsaturated 3-keto-compounds of the cyclopentano-hydrophenanthrene series in a neutral medium to a carbinol group with hydrogen in presence of a nickel catalyst.

4. A process for the manufacture of Δ⁵-3-epi-hydroxy-androstenone-(17), comprising reducing Δ⁵-androstenedione in a neutral medium with hydrogen in presence of a nickel catalyst.

5. The Δ⁵-3-epi-hydroxy-androstenes having in the 17-position a grouping which is a member of the group consisting of a keto-group and the group

wherein R₁ stands for a member of the group consisting of hydrogen and alkyl and R₂ stands for a member of the group consisting of a free, an esterified and an etherified hydroxyl group.

6. The Δ⁵-3-epi-hydroxy-androstenone-(17).

LEOPOLD RUZICKA.